US011805909B2

(12) United States Patent
Smit (10) Patent No.: US 11,805,909 B2
(45) Date of Patent: Nov. 7, 2023

(54) SEAT, PARTICULARLY A ROCKING CHAIR

(71) Applicant: F. SMIT HOLDING B.V., Doetinchem (NL)

(72) Inventor: Fernando Smit, Doetinchem (NL)

(73) Assignee: F. SMIT HOLDING B.V., Doetinchem (NL)

( * ) Notice: Subject to any disclaimer, the term of this patent is extended or adjusted under 35 U.S.C. 154(b) by 0 days.

(21) Appl. No.: 17/633,297

(22) PCT Filed: Aug. 7, 2020

(86) PCT No.: PCT/EP2020/072271
§ 371 (c)(1),
(2) Date: Feb. 7, 2022

(87) PCT Pub. No.: WO2021/023868
PCT Pub. Date: Feb. 11, 2021

(65) Prior Publication Data
US 2022/0361675 A1    Nov. 17, 2022

(30) Foreign Application Priority Data

Aug. 7, 2019   (NL) ...................................... 2023618
Aug. 19, 2019  (NL) ...................................... 2023665

(51) Int. Cl.
*A47C 3/029*   (2006.01)
*F16F 9/00*    (2006.01)
*A47C 1/00*    (2006.01)

(52) U.S. Cl.
CPC .............. *A47C 3/029* (2013.01); *F16F 9/003* (2013.01); *A47C 1/00* (2013.01); *F16F 2230/007* (2013.01)

(58) Field of Classification Search
CPC .................................. A47C 3/029; A47D 9/02
(Continued)

(56) References Cited

U.S. PATENT DOCUMENTS 793,946 A * 7/1905 Miller ..................... A47C 3/029
898,340 A * 9/1908 Dingman ............... A47C 3/029
(Continued)

FOREIGN PATENT DOCUMENTS

CN   204580541 U    8/2015
CN   106963148 A    7/2017

OTHER PUBLICATIONS

International Search Report and Written Opinion for the International Patent Application No. PCT/EP2020/072271, dated Sep. 28, 2020, 21 pages.
(Continued)

*Primary Examiner* — Sarah B McPartlin
(74) *Attorney, Agent, or Firm* — KDW FIRM PLLC (57) ABSTRACT

A seat, particularly a rocking chair, includes a frame, a seat surface and a backrest. The frame includes two lower frame parts extending forward from the backrest and each having a curved progression which is convex in downward direction. The seat can have with stop members arranged close to a front outer end and/or close to a rear outer end of each lower frame part. The stop members can be resiliently deformable. Additionally or alternatively the lower frame parts can each be covered on an underside thereof with a resilient and/or damping material. This resilient and/or damping material can comprise a shaped part connected to the relevant frame part. The stop members can be integrated in the shaped part. A stop member and a shaped part intended for application in such a seat.

15 Claims, 9 Drawing Sheets

(58) Field of Classification Search
USPC .................. 297/270.1, 270.5, 272.4, 272.2
See application file for complete search history.

(56) References Cited

U.S. PATENT DOCUMENTS

| | | | |
|---|---|---|---|
| 1,662,947 A | | 3/1928 | Banker |
| 2,054,487 A | | 9/1936 | Simpson |
| 3,669,490 A | | 6/1972 | Bertolet |
| 5,160,105 A | * | 11/1992 | Miller .................. A47C 7/002 |
| | | | 248/188.9 |
| 7,147,284 B2 | * | 12/2006 | Mills ..................... A47C 3/029 |
| | | | 297/258.1 |
| 7,837,161 B2 | * | 11/2010 | Chase .................... A47C 7/002 |
| | | | 16/42 T |

OTHER PUBLICATIONS

International Preliminary Report on Patentability for the International Patent Application No. PCT/EP2020/072271, dated Feb. 9, 2022, 7 pages.

* cited by examiner

SEAT, PARTICULARLY A ROCKING CHAIR

This application is a national stage filing under 35 U.S.C. 371 of pending International Application No. PCT/EP2020/072271, filed Aug. 7, 2020, which claims priority to Netherlands patent application serial number 2023618, filed Aug. 7, 2019, and also claims priority to Netherlands patent application serial number 2023665, filed Aug. 19, 2019, the entirety of which applications are incorporated by reference herein.

The invention relates to a seat, particularly a rocking chair, comprising a frame, a seat surface and a backrest, wherein the frame comprises two lower frame parts extending forward from the backrest and each having a curved progression which is convex in downward direction. The invention relates particularly to a seat which gives a user, for instance someone playing video games, the option of adopting different sitting postures.

Up to this point players of video games have generally sat on a sofa in front of a screen, holding a controller in their hands. Video games on mobile devices, for instance tablets or smartphones, are also often played while sitting on a sofa. The sitting posture of a player depends here on the video game. A player playing a racing game will thus lean relatively far back, while a player playing for instance a football game will sit more upright and leaning forward. A player can even change their sitting posture while playing a game. In the case of football games, it is thus for instance common to lean forward more when attacking, and conversely lean back more when defending.

A seat which is used for playing video games must thus be suitable for supporting different sitting postures. This requirement is met by a rocking chair, in which a user can move further forward or conversely further rearward, depending on the stage of the game, while sitting in the seat. When such a seat is used for playing video games, it will be moved reciprocally intensively and regularly. This entails the risk of damage to, particularly scratching of, a floor on which the lower frame parts of the seat rest. The often sudden movements moreover entail the risk of a body part, particularly a hand or foot of a player or of someone in the vicinity of the seat, for instance a spectator, becoming caught between one of the lower frame parts and the floor. In addition, rocking movements of a player which are too sudden or too forceful entail the risk of the seat tipping forward or backward, wherein the latter in particular can be dangerous. Finally, it is advantageous for the seat to also be comfortable in normal use, so that it is not usable exclusively for playing video games.

The invention has for its object to provide a rocking chair which meets these requirements. According to a first aspect of the invention, this is achieved in a seat of the above described type which is further provided with at least one stop member arranged close to a front outer end and/or close to a rear outer end of each lower frame part. With such a stop member the seat can be prevented from tipping forward or backward when a player rocks too forcefully or gets up from the seat abruptly.

In order not to abruptly cut short the forward or rearward directed rocking movement of the seat the at least one stop member can be resiliently deformable. Herein the resilient deformability may be achieved through a suitable structural design of the stop member.

The at least one stop member can here have a variable height as seen in longitudinal direction of the relevant frame part. The stop member can thus deform gradually.

As seen from the centre of the lower frame part, the height can increase gradually in the direction of the relevant outer end, whereby the stop member functions as a type of wedge under the frame part and wholly or partially fills up a space under the rising outer end of the lower frame part. As a result the seat is very stable, since in an unloaded state the stop members almost completely negate the curvature of the lower frame part. Only when a user lower himself into the seat does this become mobile since the stop members are deformed under the influence of the weight of the user. Since the deformation of the stop members, and thereby the mobility of the seat depends on the weight of the user, the seat is safe for use by children. In fact, the stop members will restrict movements of relatively lightweight user to a larger extent than those of heavier users, such as adults.

The at least one stop member may have a side facing the ground during use, which defines a variable radius of curvature. Herein the radius of curvature may decrease from the centre of the lower frame part in the direction of the outer ends thereof. Thus the stop member is relatively flat near the centre of the lower frame part, and more strongly curved near the relevant outer end.

For optimal deformability a part of the at least one stop member which protrudes outside the lower frame part can have an open section.

Such an open section can for instance be formed in that the at least one stop member comprises a number of chambers. A suitable choice of position and dimensions of the chambers enables the deformability of the stop member to be designed specifically for a determined rocking behaviour.

In order to enable further optimization of the deformability at least one of the chambers can be filled with a material differing from the material of the at least one stop member.

In a practical embodiment the at least one stop member comprises an upper band connected to the frame part, a number of spacers protruding from the upper band and defining the chambers between them, and a lower band connected to free ends of the spacers. An open sectional form can thus be created in simple manner.

In order to allow controlled deformation of the stop member at least a part of the spacers can be bent or curved.

The at least one stop member may be made of a resilient and/or damping material. Such a material may contribute to the resilient deformability of the stop member, in addition to the structural design.

According to another aspect, the invention provides a seat of the type described in the preamble, in which the lower frame parts are each covered on an underside thereof with a resilient and/or damping material. This prevents wear of the ground surface, while additionally improving the comfort of the seat during movements. The consequences of inadvertently becoming trapped are moreover reduced by such a layer. Such a resilient and/or damping material can be applied together with or instead of a stop member.

The resilient and/or damping material can be a shaped part connected to the relevant frame part. The resilient and/or damping material can thus be arranged in simple manner.

When the shaped part is connected releasably to the relevant frame part, it can be exchanged in simple manner, for instance in the case of wear. For this purpose the shaped part can comprise fastening elements co-acting with the frame part, for instance protrusions which can be pressed into openings in the frame part. On the other hand, it is possible to envisage the shaped part being connected non-releasably to the seat, for instance by gluing.

In an embodiment of the seat according to the invention the shaped part extends from a position close to a front outer end of the relevant frame part to a position close to a rear outer end thereof, so that the frame part is protected over substantially its whole length.

The shaped part can here comprise a number of segments which connect to each other in longitudinal direction of the relevant frame part and are easier to handle than a single shaped part having the length of a frame part. The segments can here comprise, as seen in longitudinal direction of the relevant frame part, a front segment, a rear segment and at least one middle segment placed therebetween. By varying the middle segments shaped parts of different lengths can thus be composed in simple manner.

On the other hand, the shaped part can be formed integrally, whereby it can be mounted under the seat in simple manner.

In an embodiment of the seat according to the invention the shaped part has over at least a part of its length a substantially constant cross-section. A shaped part with constant cross-section can be manufactured in simple manner by means of extrusion.

For optimal connection and protection the shaped part can tightly enclose the relevant frame part at least partially in cross-section. For this purpose the shaped part can have on its upper side a recess for receiving the relevant frame part.

In order to prevent shifting of the seat during rocking the shaped part can have a profile on its underside.

For an optimal operation the resilient and/or damping material can comprise rubber. In addition, it is possible to envisage the resilient and/or damping material comprising a plastic, for instance an elastomer such as TPU.

Finally, a structurally simple solution is obtained when the at least one stop member is integrated in the shaped part.

The invention also relates to a stop member and a shaped part for application in a seat as described above.

The invention is elucidated hereinbelow on the basis of a number of embodiments, wherein reference is made to the accompanying drawing in which corresponding components are designated with reference numerals increased by 100, and in which.

Figure 1:
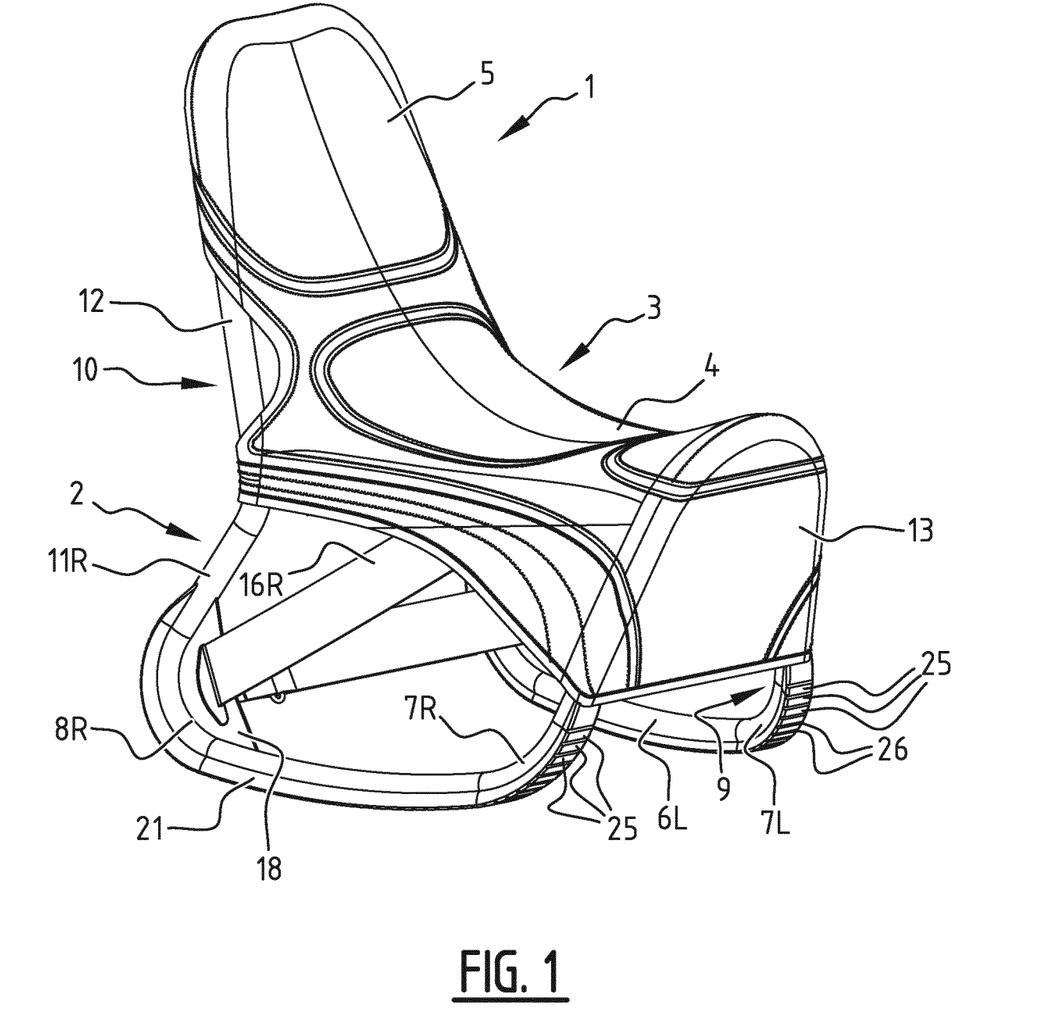
FIG. 1 shows a perspective front view of a seat according to an embodiment of the invention.
Figure 2:
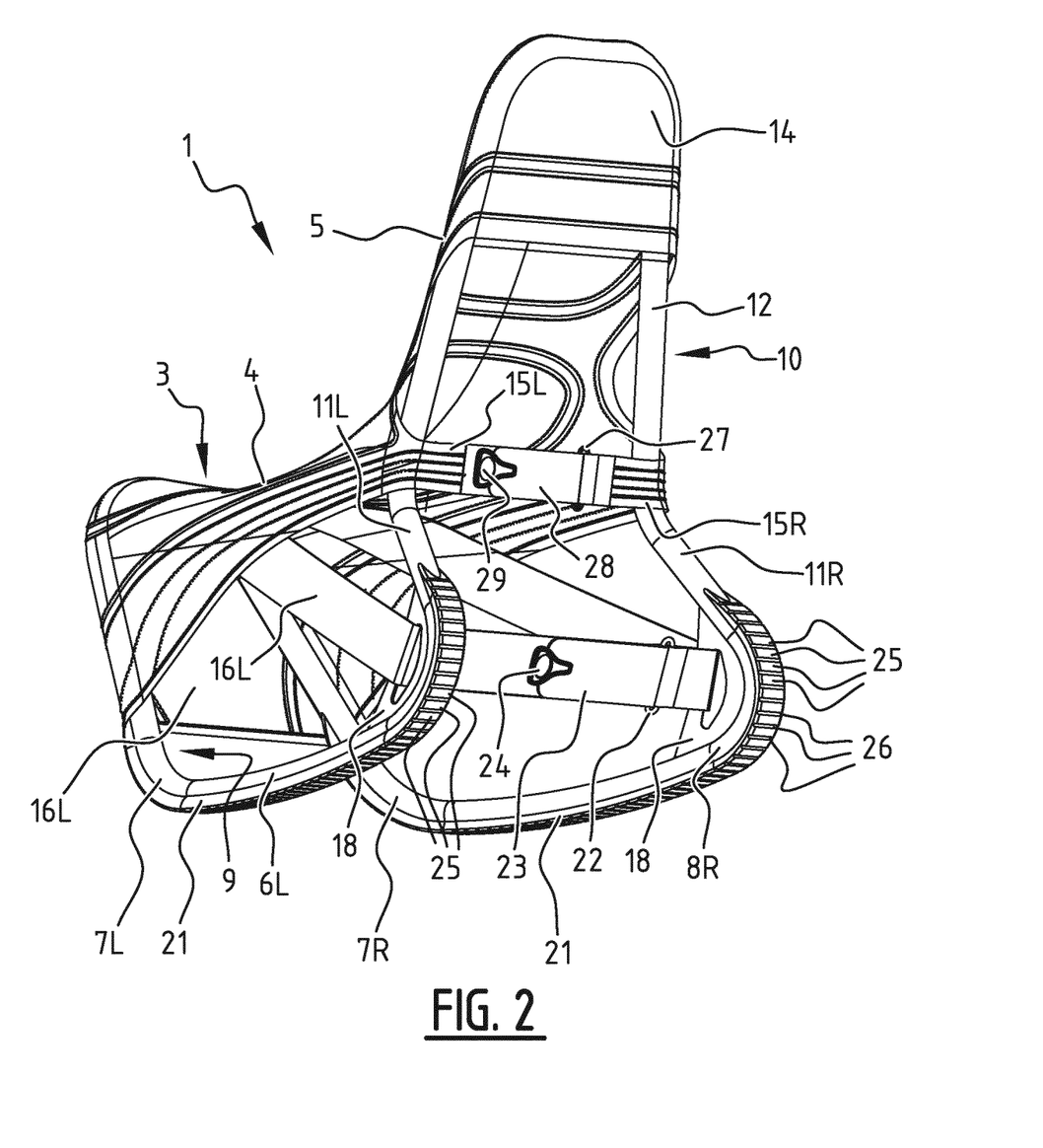
FIG. 2 shows a perspective rear view of the seat of FIG. 1.
Figure 3:
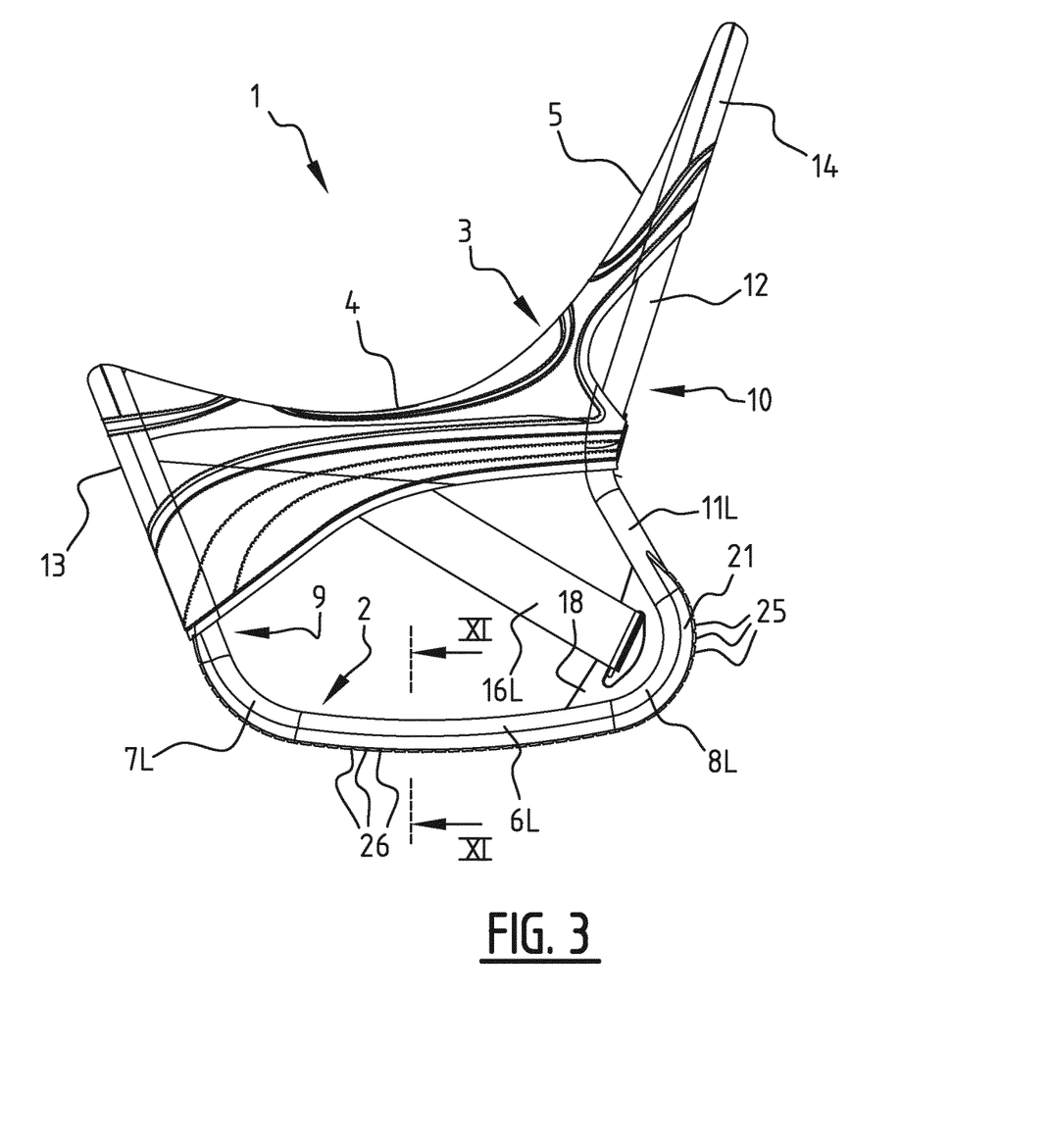
FIG. 3 shows a side view of the seat of FIGS. 1 and 2.

A seat 1, particularly a rocking chair, comprises a frame 2, a seat surface 4 and a backrest 5. In this embodiment the frame 2 is tubular and tensioned thereover is a cloth 3 which forms the seat surface 4 and the backrest 5 (FIG. 1-3). Frame 2 has two lower frame parts 6L, 6R extending in longitudinal direction of the seat, so in forward direction from backrest 5. Each of the lower frame parts 6L, 6R has a curved progression which is convex in downward direction, this enabling seat 1 to rock. Each lower frame part 6L, 6R has a front outer end 7L, 7R and a rear outer end 8L, 8R. A front transverse frame part 9 connects the two lower frame parts 6L, 6R at their front outer ends 7L, 7R, while a rear transverse frame part 10 connects the lower frame parts 6L, 6R at their rear outer end 8L, 8R.

The front and rear transverse frame parts 9, 10 extend substantially transversely upward from the lower frame parts 6L, 6R and in the shown embodiment each have a curved progression which is convex in upward direction. The rear transverse frame part 10 here protrudes further above lower frame parts 6L, 6R than the front transverse frame part 9, so that rear transverse frame part 10 is able to support the upper side of backrest 5. Rear transverse frame part 10 here first has on either side a lower segment 11L, 11R which connects to the lower frame part 6L, 6R and which extends substantially parallel to the front transverse frame part 9. An upper segment 12 then connects to the two lower segments 11L, 11R, which upper segment extends rearward, so in opposite direction to the front transverse frame part 9. The backrest 5 of the seat is hereby as it were shifted forward relative to the lower frame parts 6L, 6R, whereby someone sitting on seat 1 is prevented from falling backward when he or she leans against backrest 5.

Figure 9:
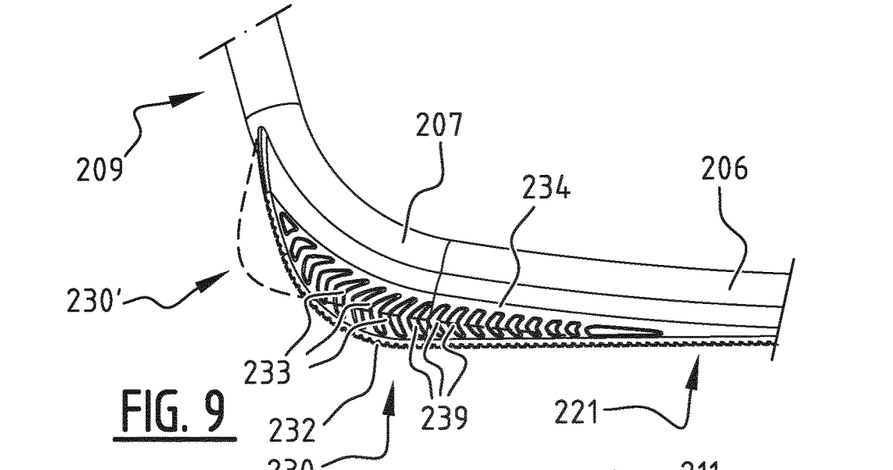
FIG. 9 shows a detail view on enlarged scale as according to arrow IX in FIG. 7.

In side view (FIG. 3) frame 2 thus has a substantially U-shaped cross-section, wherein one of the legs is longer than the other, while in front or rear view the transverse frame parts 9, 10 each have a reverse U-shape. The transitions between the lower frame parts 6L, 6R and the transverse frame parts 9, 10 otherwise also each have a curved progression so that frame 2 as a whole takes the form of a loop bent upward on the front and rear side (FIG. 9).

As stated, the cloth is tensioned over frame 2 in order to form the seat surface 4 and the backrest 5. Cloth 3 is for this purpose provided close to its front side and rear side with folded-over end parts 13, 14 in which the upper ends of the front and rear transverse frame parts 9, 10 can be received. Cloth 3 is thus tensioned on frame 2 in longitudinal direction of seat 1.

In addition, cloth 3 is tensioned in transverse direction of seat 1 toward the two lower frame parts 6L, 6R. For this purpose cloth 3 is provided on either side with a tensioning member 16L, 16R which extend to points of attachment 18 at the position of the rear outer ends 8L, 8R of the lower frame parts 6L, 6R. These points of attachment 18 here take the form of brackets which are arranged in the transition between lower frame parts 6L, 6R and rear transverse frame part 10 and around which free outer ends of the tensioning members 16L, 16R are folded. The free outer end of tensioning member 16R is here provided with a bracket 22 through which the free outer end 23 of tensioning member 16L is placed, after which it is fastened to itself by means of a fastening member 24.

Cloth 3 is further provided with two tensioning members 15L, 15R which are connected to each other behind the transverse frame part 10. For this purpose tensioning member 15R has a bracket 27 through which a free outer end 28 of tensioning member 15L is placed, after which this is likewise fixed to itself using a fastening member 29.

In this way cloth 3, when tensioned in frame 2, forms a double-curved surface. As stated, the thus formed rocking chair 1 is suitable for playing video games. A player can here sit on seat 1 with his or her feet on either side of the lower frame parts 6L, 6R and find a suitable sitting posture, upright, leaning forward or leaning back, irrespective of the game and the stage of the game. The point where seat 1 makes contact with the ground surface shifts forward or rearward here.

In this embodiment of the seat 1 according to the invention the lower frame parts 6L, 6R are each covered on their underside with a resilient and/or damping material, for instance a soft plastic or natural or synthetic rubber. This resilient and/or damping material is here arranged on the lower frame parts 6L, 6R in the form of shaped parts 21 which extend from the front outer end 7L, 7R to the rear outer end 8L, 8R of each lower frame part 6L, 6R. In the shown embodiment the shaped parts even extend from the front transverse frame part 9 to the rear transverse frame part 10.

Figure 11:
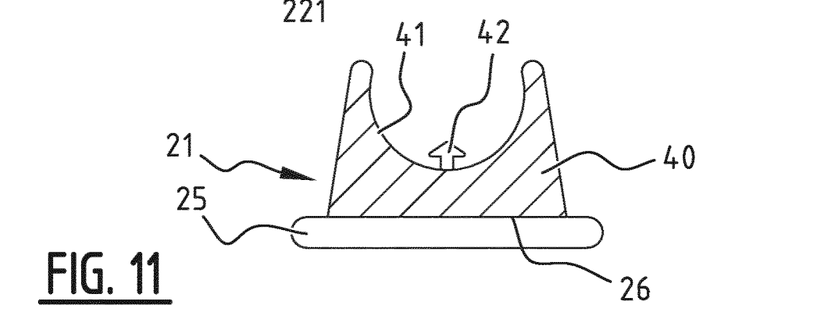
FIG. 11 shows a cross-section along the line XI-XI in FIG. 3.

These shaped parts 21 can be connected releasably to the lower frame parts 6L, 6R so that they can be replaced in the case of wear. For this purpose each shaped part 21 can for instance be provided with a number of fastening elements, for instance upward directed protrusions 42 (FIG. 11), which can be inserted into openings in the underside of the corresponding frame parts 6L, 6R. In this embodiment the shaped parts 21 partially enclose the corresponding frame parts 6L, 6R so that a strong connection is formed. For this purpose each shaped part 21 comprises here a body 40 in which on the upper side a recess 41 is formed, the cross-section of which corresponds to that of the corresponding frame part 6L, 6R.

On the other hand, it is possible to connect shaped parts 21 to the lower frame parts 6L, 6R permanently, for instance by gluing. An adhesive connection can optionally be combined with a mechanical connection, for instance by means of the above stated protrusions or by screws which are fastened through the shaped parts and in openings in lower frame parts 6L, 6R.

Each shaped part 21 is further provided on its underside with a profile in order to prevent shifting of seat 1 during the reciprocal movement. In the shown embodiment the profile comprises a series of parallel rectangular blocks 25 which are separated from each other by grooves 26.

In this embodiment shaped parts 21 have a substantially constant cross-sectional form over their whole length, and can thus for instance be manufactured by extrusion. Although each shaped part 21 is here a whole extending over the length of the corresponding frame part 6L, 6R, it is also possible to envisage each shaped part 21 being constructed from a number of segments which are placed contiguously one behind the other. A front and rear segment can here be used, the curvature of which is adapted to that of the front and rear ends 7, 8 of the lower frame part 6. One or more substantially straight middle segments can be placed therebetween in order to achieve the desired length.

Figure 4:
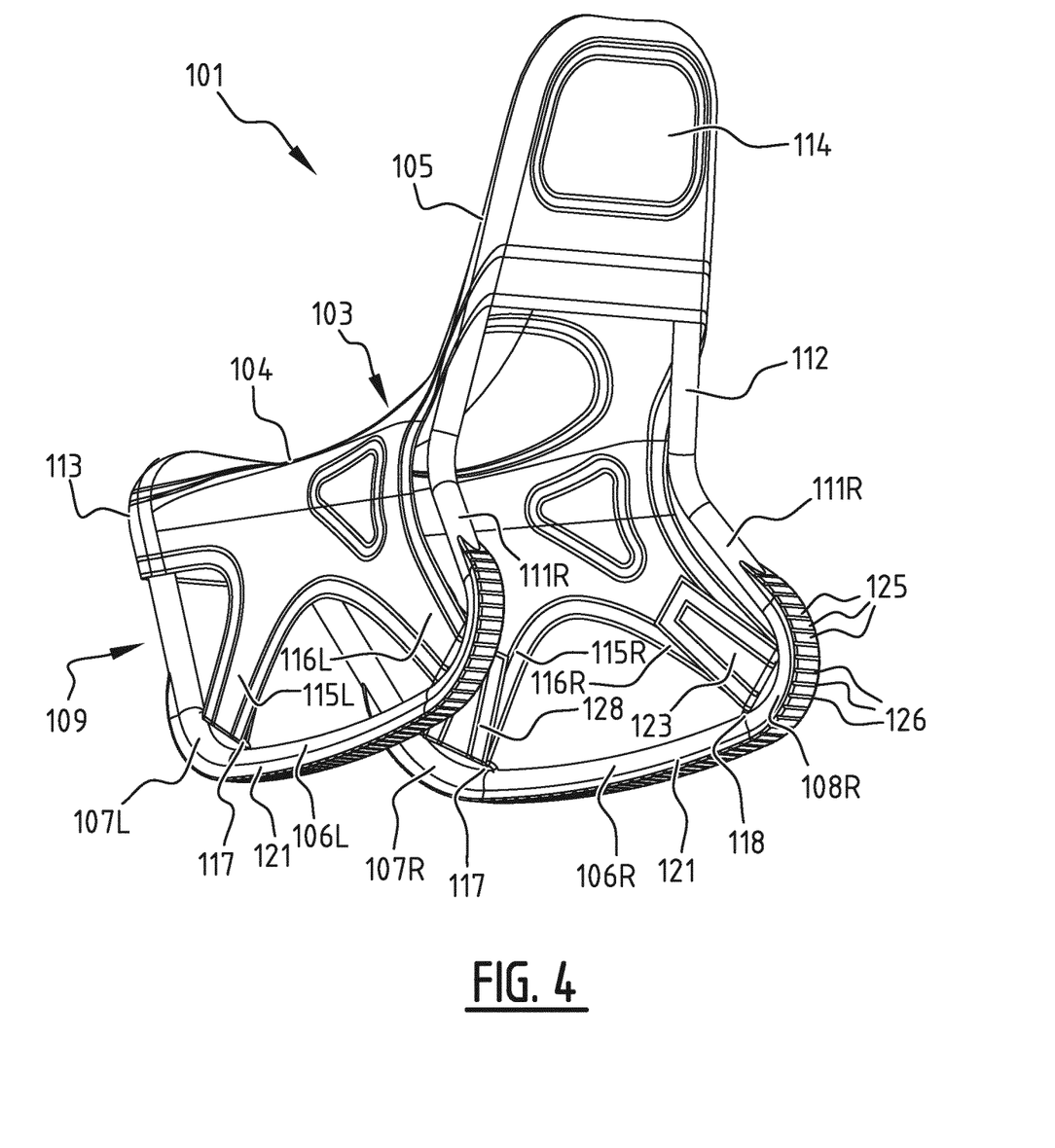
FIG. 4 shows a perspective rear view of an alternative embodiment of the seat according to the invention.

In another embodiment of the seat 101 according to the invention the frame 102 is provided not with one but with two pairs of points of attachment 117, 118 which are arranged close to respectively the front outer ends 107L, 107R and the rear outer ends 108L, 108R of lower frame parts 106L, 106R (FIG. 4). In this embodiment cloth 103 is provided with two pairs of tensioning members 115L, 115R and 116L, 116R, which are tensioned toward the front and rear points of attachment 117, 118 and the ends 123, 128 of which are folded over and fastened, for instance with velcro tape. In this embodiment there is thus no connection between the tensioning members on the left-hand and right-hand side which exerts tension on the frame in transverse direction.

Figure 5:
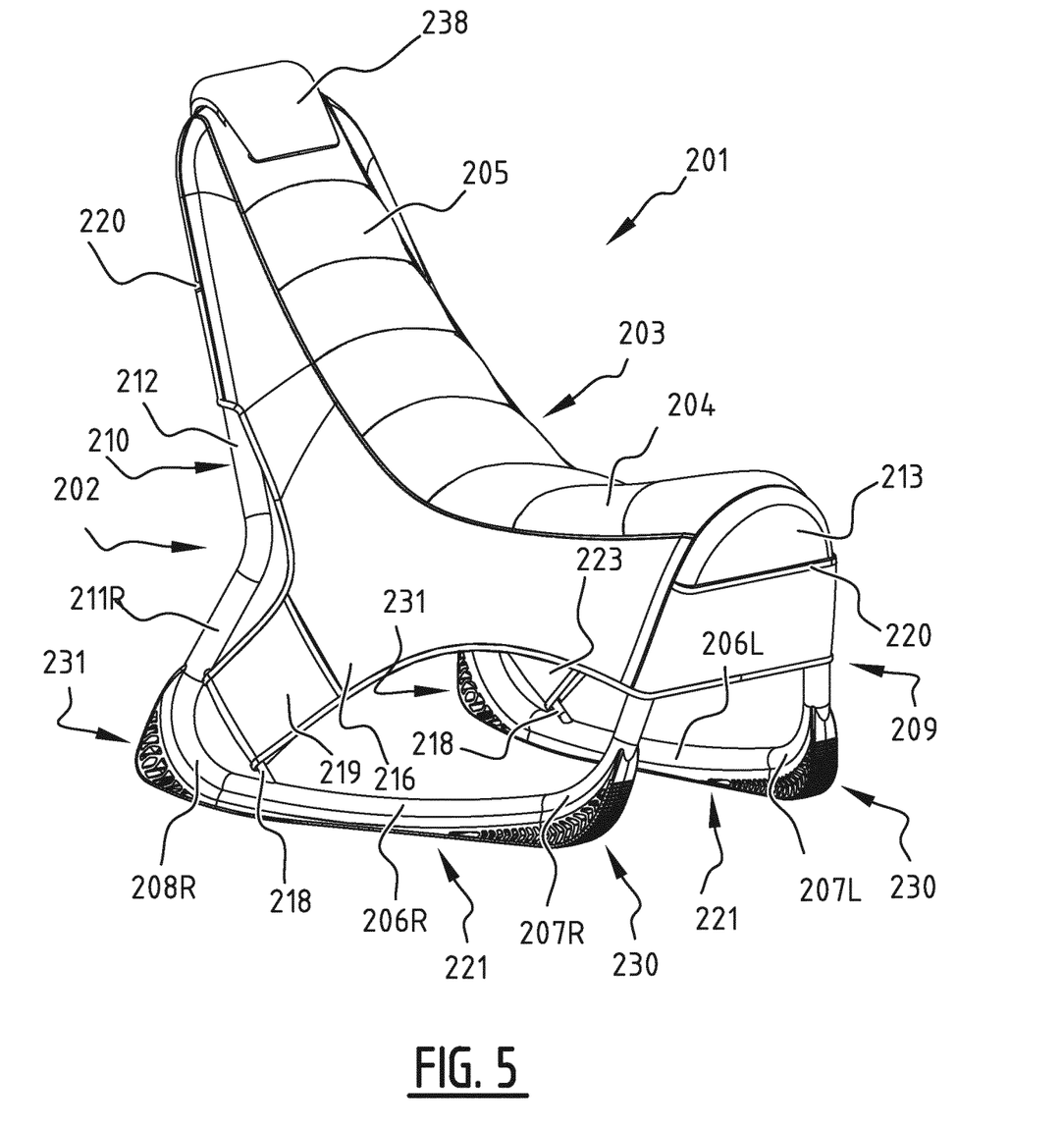
FIGS. 5, 6 and 7 show views corresponding with FIG. 1-3 of yet another embodiment of the seat according to the invention.
Figure 6:
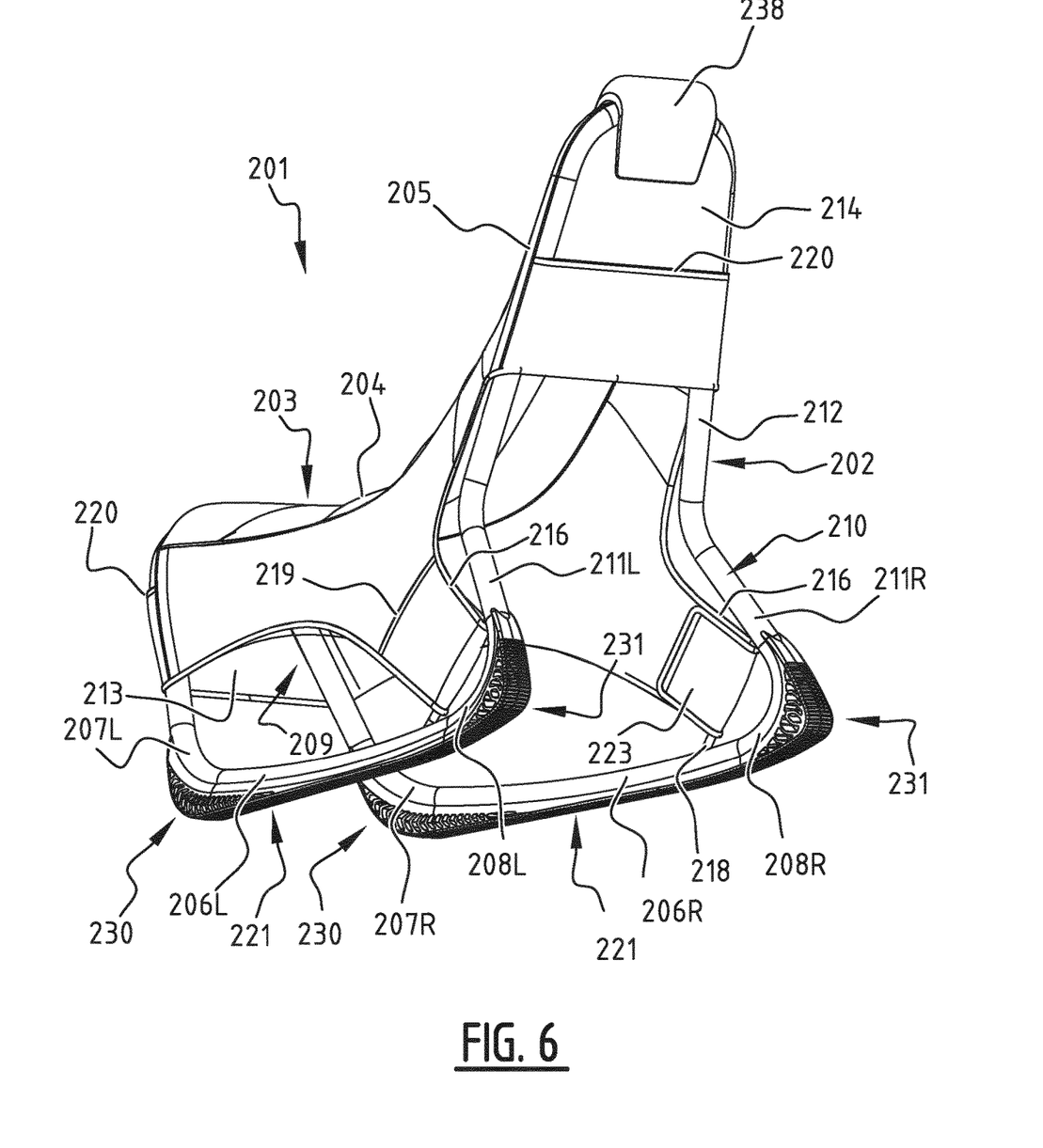
Figure 7:
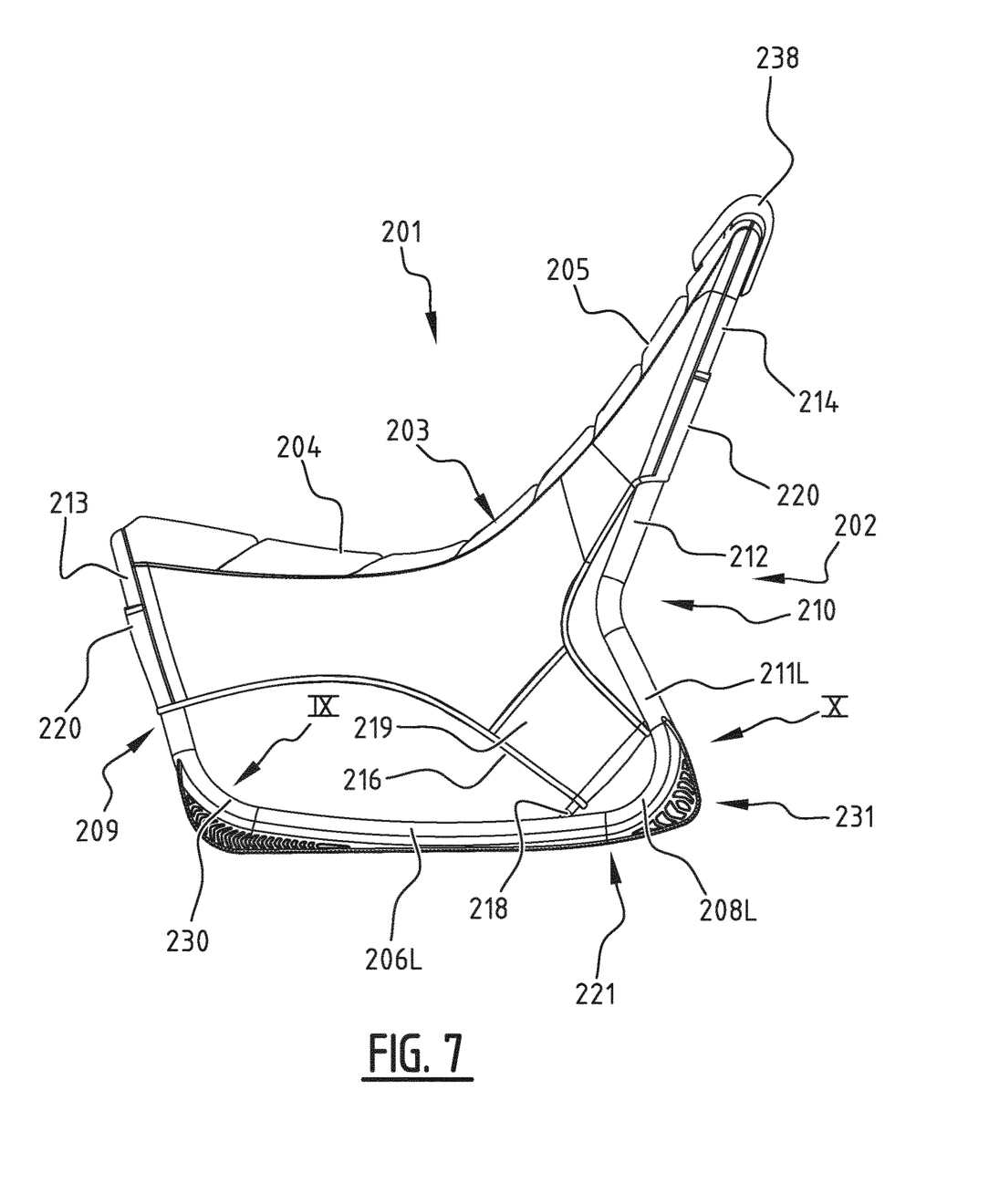

In yet another embodiment of the seat 201 according to the invention (FIG. 5-7) the cloth 203 is provided, as in the first embodiment, with two tensioning members 216 which in turn are attached to points of attachment 218 close to the rear outer ends 208L, 208R of the lower frame parts 206L, 206R. These tensioning members 216 are not connected to each other but, as in the second embodiment, their free outer ends 223 are folded over and fastened to themselves.

Figure 8:
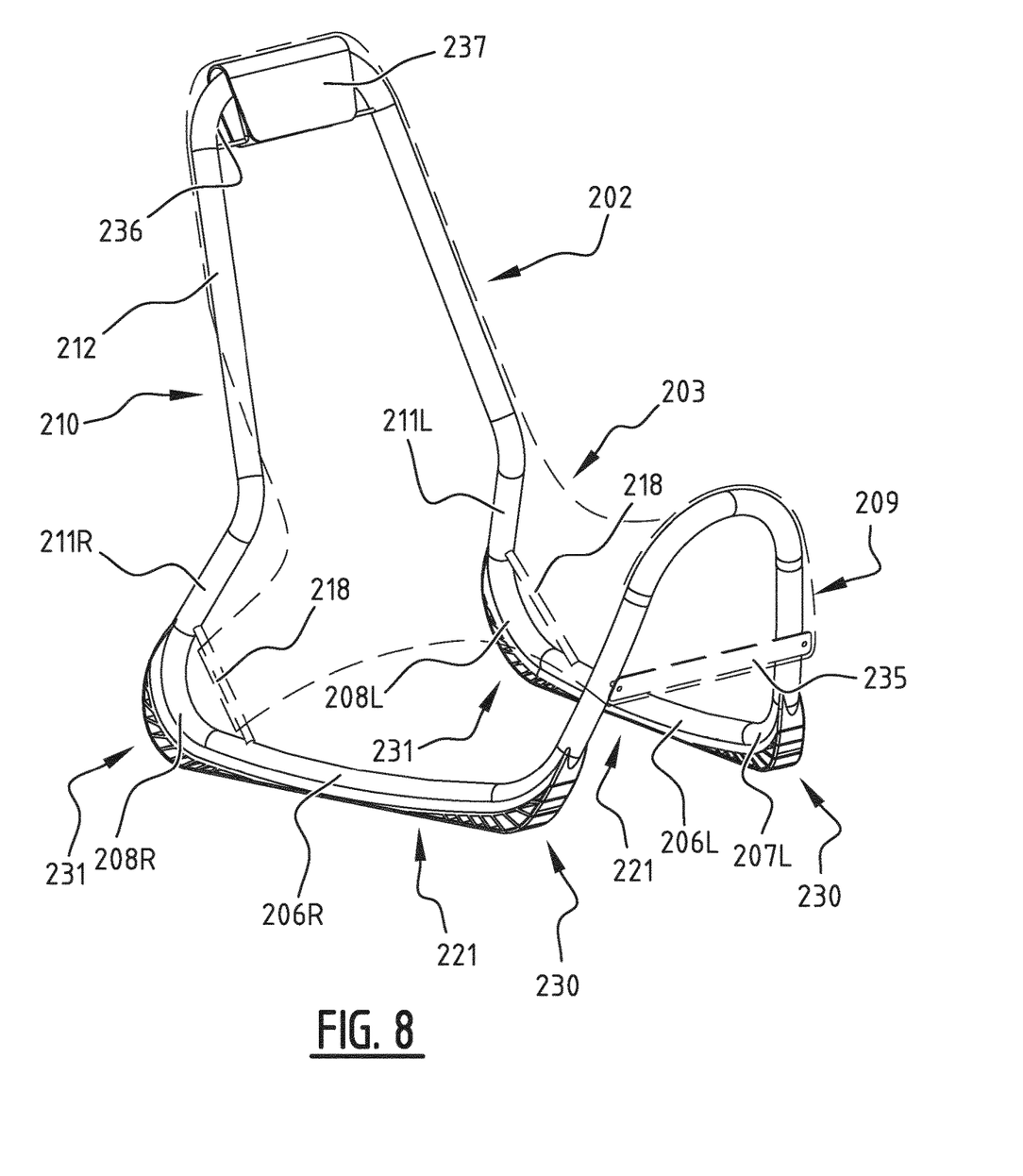
FIG. 8 shows a perspective front view of a frame for the seat according to FIG. 5-7, wherein seat surface and backrest are shown in broken lines.

In order to maintain sufficient tension on the folded-over end parts 213, 214 of cloth 203 the front and rear transverse frame parts 209, 210 are in this embodiment strengthened by arranging cross braces therein. In the shown embodiment a transverse rod 235 is arranged between the legs of the reverse U-shaped front frame part 209 (FIG. 8). A transverse rod 236 is here further arranged between the legs of the reverse U-shaped rear frame part 210, which rod co-acts with a strengthening profile 237 which is folded over the upper side of the rear transverse frame part 210. Strengthening profile 237 further serves as carrier for a headrest 238 which is arranged on the upper side of backrest 205.

In the shown embodiment the cloth 203 is further provided on either side with pockets 219 for receiving a mobile phone of a player, while cloth 203 has on both front side 213 and rear side 214 a pocket 220 for receiving a control unit for a video game.

In this embodiment it can be clearly seen that respective stop members 230, 231 are in each case formed close to the front and rear outer ends 207, 208 of the left-hand and right-hand lower frame parts 206L, 206R. These stop members 230, 231 brake excessive forward or rearward rocking movements and prevent seat 201 from falling over. For this purpose each stop member 230, 231 has a variable height as seen in longitudinal direction of the relevant frame part 206, whereby the spaces under the upward curved front and rear outer ends 207, 208 of lower frame part 206 are as it were filled in.

Each stop member 230, 231 also has a radius of curvature which is variable in longitudinal direction of the frame part 206, and which progressively decreases from the centre of the frame part 206 towards the front and rear outer ends 207, 208, respectively. In this way a gradually increasing resistance to further deformation, and thereby to further rocking motion is formed.

In this embodiment stop members 230, 231 are incorporated in the shaped part 221 of resilient and/or damping material, and are themselves also resiliently deformable. For this purpose each stop member 230, 231 is provided with an open section which comprises a number of chambers 239.

In the shown embodiment each stop member 230, 231 is formed by a resiliently flexible strip or lower band 232 which is connected by means of a number of resiliently flexible spacers or lamella 233 to a strip or upper band 234 mounted on lower frame part 206. Spacers or lamella 233, these defining chambers 239 therebetween, have different lengths or heights so that the distance between lower and upper band 232, 234 varies in longitudinal direction of lower frame part 206. In order to increase the flexibility of the spacers or lamella 233 they take a bent or curved form here. Each stop 230, 231 thus in fact forms a protrusion under the corresponding curved outer end 207, 208.

The presence of the chambers 239 weakens the stop member 230, 231 locally, whereby the deformability can be controlled. On the other hand, it is also possible to envisage some chambers 239 being filled with a material other than the material of the stop member 230, 231, so that chambers 239 form a less serious weakening, or conversely a stiffening, when the other material is stiffer.

Figure 10:
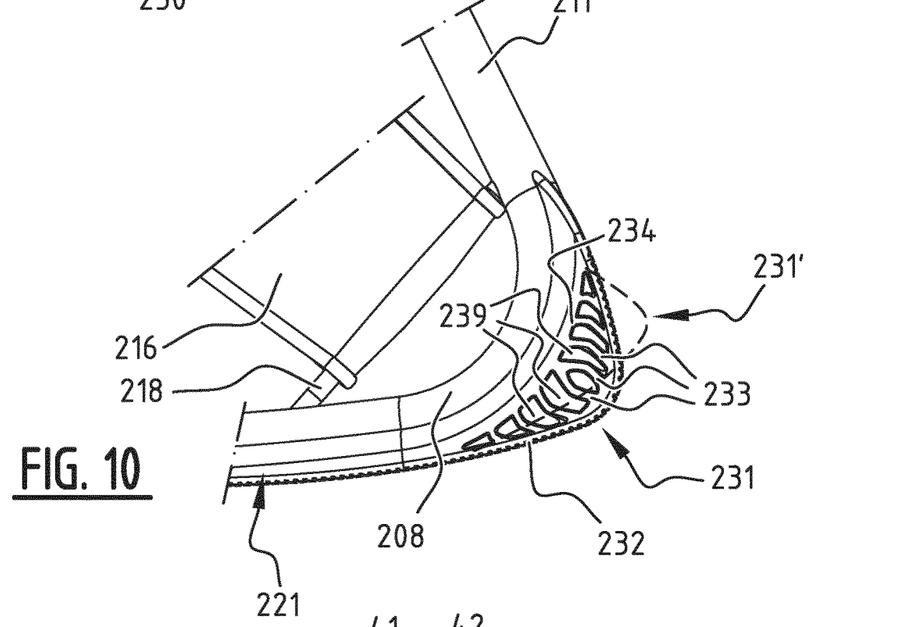
FIG. 10 shows a detail view on enlarged scale as according to arrow X in FIG. 7.

When seat 201 pivots forward or rearward under the influence of a movement of a user, for instance a player of video games, the spacers or lamella 233 are deformed in succession, whereby the movement is braked and damped. The flexible lower band 232 will here deform (shown with broken lines 230', 231' in FIG. 9 and FIG. 10), wherein its outermost point of contact with the ground surface shifts increasingly further in order to prevent inadvertent tipping over of seat 201.

Although the invention has been elucidated above on the basis of a number of embodiments, it will be apparent that it is not limited thereto but can be varied in many ways. The shaped part of resilient and/or damping material, which was described above in connection to a specific seat with a closed tubular frame and a cloth tensioned thereover, could thus also be applied in combination with a conventional rocking chair with a fixed seat surface and backrest, and with legs which are positioned on the curved lower frame parts. The same also applies to the stop members, which can likewise be useful in a conventional rocking chair. Materials other than those described above can further be applied, and the different components can be embodied in different ways. Instead of upper and lower bands with lamella placed therebetween, the stop members with open section could also be embodied in other manner, for instance by making openings in a stop member which takes a solid form.

The scope of the invention is therefore defined solely by the following claims.

The invention claimed is:

1. A seat comprising:
a frame,
a seat surface, and
a backrest,
wherein the frame comprises two lower frame parts extending forward from the backrest and each having a curved progression which is convex in downward direction, and
wherein at least one stop member is arranged close to a front outer end and/or close to a rear outer end of each lower frame part;
wherein a part of the at least one stop member which protrudes outside the lower frame part has an open section;
wherein the at least one stop member comprises a number of chambers; and
wherein the at least one stop member comprises an upper band connected to the frame part, a number of spacers protruding from the upper band and defining the chambers between them, and a lower band connected to free ends of the spacers.

2. The seat according to claim 1, wherein the at least one stop member is resiliently deformable.

3. The seat according to claim 1, wherein the at least one stop member has a variable height as seen in longitudinal direction of the associated frame part.

4. The seat according to claim 1, wherein at least one of the chambers is filled with a material differing from the material of the at least one stop member.

5. The seat according to claim 1, wherein at least a part of the spacers is bent or curved.

6. The seat according to claim 1, wherein the at least one stop member is at least partially made of a resilient and/or damping material.

7. The seat according to claim 1, wherein the lower frame parts are each covered on an underside thereof with a resilient and/or damping material.

8. The seat according to claim 7, wherein the resilient and/or damping material comprises a shaped part connected to the relevant frame part, and/or wherein the shaped part is connected releasably to the relevant frame part, and/or wherein the shaped part comprises fastening elements co-acting with the frame part.

9. The seat according to claim 8, wherein the shaped part extends from a position close to a front outer end of the relevant frame part to a position close to a rear outer end thereof.

10. The seat according to claim 8, wherein the shaped part comprises a number of segments which connect to each other in longitudinal direction of the relevant frame part, and/or wherein the segments comprise, as seen in longitudinal direction of the relevant frame part, a front segment, a rear segment and at least one middle segment placed therebetween, and/or wherein the shaped part is formed integrally.

11. The seat according to claim 8, wherein the shaped part has over at least a part of its length a substantially constant cross-section.

12. The seat according to claim 8, wherein the shaped part encloses the relevant frame part at least partially in cross-section, and/or wherein the shaped part has on its upper side a recess for receiving the relevant frame part.

13. The seat according to claim 8, wherein the shaped part has a profile on its underside.

14. The seat according to claim 6, wherein the resilient and/or damping material comprises rubber, or wherein the resilient and/or damping material comprises a plastic.

15. The seat according to claim 8, when dependent on any one of the claims 1-6, wherein the at least one stop member is integrated in the shaped part.

* * * * *